(12) United States Patent   (10) Patent No.: US 12,577,973 B2

Poland   (45) Date of Patent: Mar. 17, 2026

(54) COLLAPSIBLE SPACER FOR SETTING GAP BETWEEN ADJACENT PANELS

(71) Applicant: Marshall Ellison Poland, Boulder, CO (US)

(72) Inventor: Marshall Ellison Poland, Boulder, CO (US)

(73) Assignee: Slick Tools LLC, Longmont, CO (US)

( * ) Notice: Subject to any disclaimer, the term of this patent is extended or adjusted under 35 U.S.C. 154(b) by 187 days.

(21) Appl. No.: 18/186,178

(22) Filed: Mar. 19, 2023

(65) Prior Publication Data

US 2023/0304520 A1   Sep. 28, 2023

Related U.S. Application Data

(60) Provisional application No. 63/324,073, filed on Mar. 26, 2022.

(51) Int. Cl.
| | |
|---|---|
| *F16B 5/06* | (2006.01) |
| *H02S 30/10* | (2014.01) |
| *F24S 25/00* | (2018.01) |
| *F24S 40/80* | (2018.01) |
| *F24S 80/00* | (2018.01) |

(52) U.S. Cl.
CPC ............ *F16B 5/0621* (2013.01); *H02S 30/10* (2014.12); *F24S 2025/014* (2018.05); *F24S 2025/016* (2018.05); *F24S 40/80* (2018.05); *F24S 2080/015* (2018.05)

(58) Field of Classification Search
CPC ........ F16B 5/0621; H02S 30/10; H02S 30/00; H02S 99/00; F24S 40/80; F24S 2025/014; F24S 2025/016; F24S 2080/015
See application file for complete search history.

(56) References Cited

U.S. PATENT DOCUMENTS

| | | | | |
|---|---|---|---|---|
| 4,170,920 A | * | 10/1979 | Siebol | F16B 19/008 |
| | | | | 411/43 |
| 4,505,010 A | * | 3/1985 | Arenhold | F16B 2/245 |
| | | | | 267/74 |
| 5,630,306 A | * | 5/1997 | Wylie | E06B 3/67304 |
| | | | | 29/897.3 |
| 2008/0152849 A1 | * | 6/2008 | Lenhardt | E06B 3/667 |
| | | | | 428/34 |
| 2009/0010732 A1 | * | 1/2009 | Baumbach | F16B 5/0258 |
| | | | | 411/19 |
| 2015/0201972 A1 | * | 7/2015 | Doubler | A61B 17/7002 |
| | | | | 606/266 |
| 2015/0252826 A1 | * | 9/2015 | Cooley | F16B 2/20 |
| | | | | 24/499 |
| 2016/0032598 A1 | * | 2/2016 | Anderson | E04F 21/0092 |
| | | | | 206/349 |
| 2019/0224013 A1 | * | 7/2019 | El Zoghbi | A61F 2/4607 |
| 2019/0323544 A1 | * | 10/2019 | Li | F16B 5/0233 |
| 2020/0392980 A1 | * | 12/2020 | Phan | F16B 41/002 |

\* cited by examiner

*Primary Examiner* — David M Upchurch

(74) *Attorney, Agent, or Firm* — Renner, Otto, Boisselle & Sklar, LLP

(57)   ABSTRACT

A spacer which can be temporarily inserted between two panels, such as solar modules, prior to securing the panels; such that a consistent gap is established between the panels; and a method for using said spacer. The spacer includes a collapsing feature which relieves pressure on the spacer from the adjacent panels for easier removal of the spacer. The spacer may use a cam feature to collapse its size prior to removal.

12 Claims, 6 Drawing Sheets

A - A

B - B

C - C

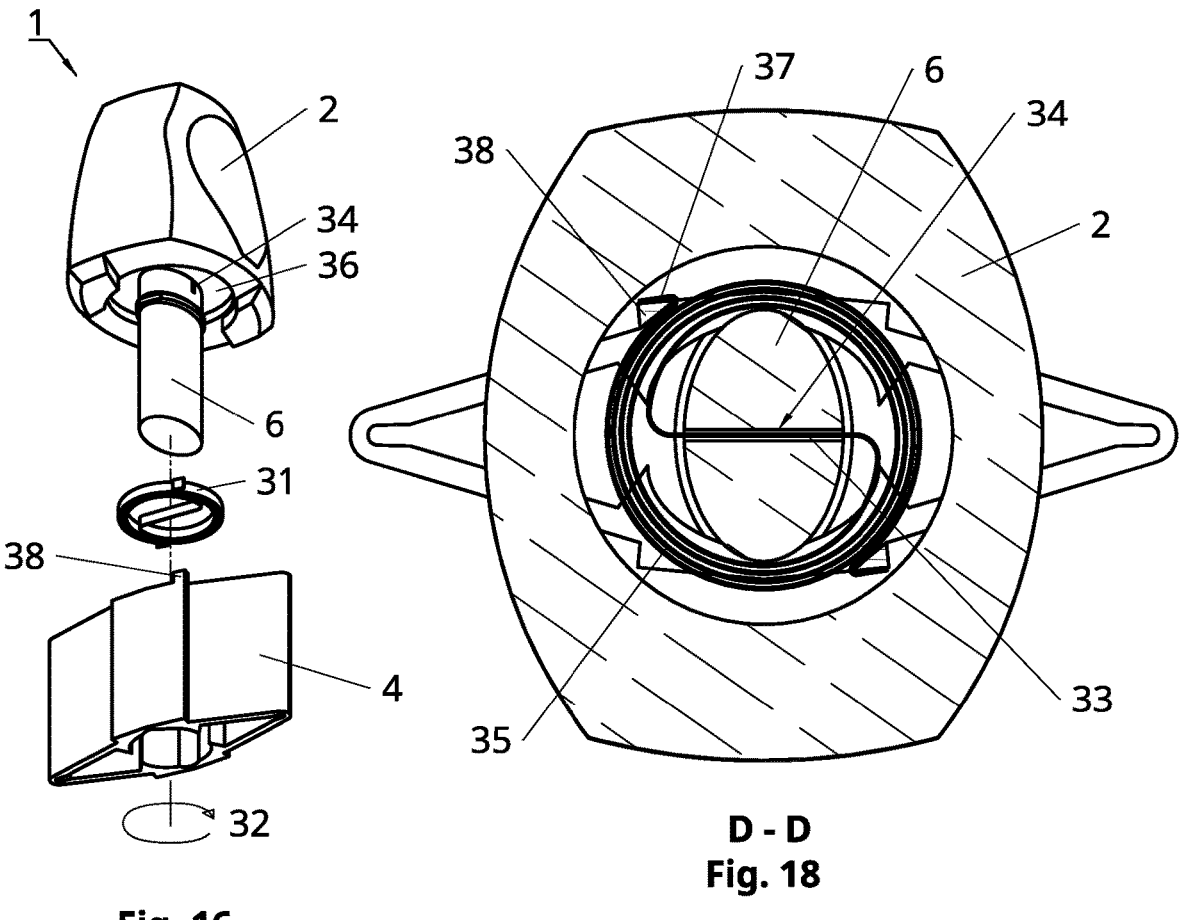
Fig. 16
D - D
Fig. 18
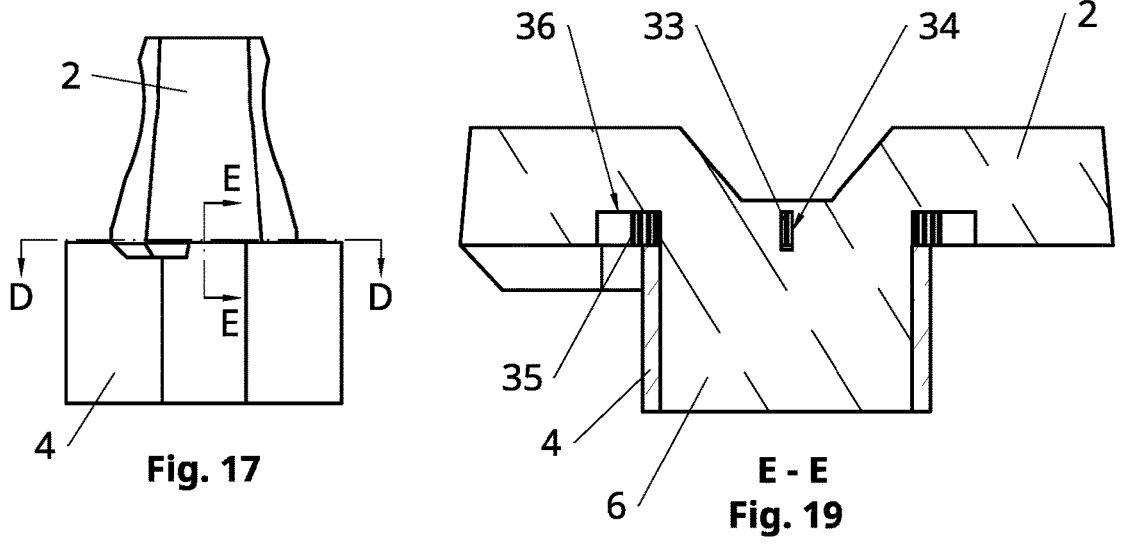
Fig. 17
E - E
Fig. 19

COLLAPSIBLE SPACER FOR SETTING GAP BETWEEN ADJACENT PANELS

RELATED APPLICATIONS

This application claims priority of U.S. Provisional Application No. 63/324,073, filed on Mar. 26, 2022, which is incorporated herein by reference in its entirety.

BACKGROUND OF THE INVENTION

The invention relates to the field of construction, and more particularly, to the installation of solar photovoltaic modules.

Demand for solar photovoltaic modules, also known as solar panels, is increasing around the world. As such, solar system installers are under increasing pressure to eliminate inefficiencies in their work.

When solar panels are installed adjacent to one another, the industry best practice is to leave a small gap between panels to allow for airflow and thermal expansion of the panels. The size of this gap must be controlled for several reasons.

If the gap is too large, animals and debris can pass through the gap and build up underneath the solar array. A large gap also reduces the number of solar panels that can fit into a given available surface area, reducing the space-efficiency of the solar system.

If the gap is too small, the panels may touch each other due to thermal expansion. Airflow around the panels may also be inhibited, which can raise the temperature of the photovoltaic panels. Solar panels are known to produce less power at elevated temperatures.

If the gap between panels is inconsistent between different modules in a large array, poor aesthetics may result. Furthermore, the panels may fall outside of the usable footprint provided by their supporting structure, also known as racking.

It is therefore common to insert a temporary spacer between solar panels while installing them, to ensure a consistent gap of the proper size. The spacer can be removed after the adjacent solar panels are fastened to their supporting structure.

Common practice in the solar industry is to use a rigid object; such as a bolt, screw or a solid piece of plastic; as a spacer between solar modules before they are fastened. The object is removed after the panels are fastened.

Because solar arrays are usually tilted at an angle to the horizontal plane, any rigid spacer used to establish the gap between panels must often support the weight of an upper solar panel which would otherwise slide downhill. The weight of this upper panel is transferred through the spacer to the lower panel and into the racking. Fastening the upper solar panels to the racking does not immediately relieve this compressive force; the force remains until the spacer is removed and the solar panel is allowed to settle slightly, at which point the weight of the upper panel transfers to the racking.

In addition to its own weight, the panel resting on the spacer is often subject to a second, additional downward load caused by the installer(s). When reaching to remove the spacer, the installer sometimes has no choice but to rest some of his/her own weight on the upper panel which has just been fastened; or on adjacent racking or panels attached to the same racking. This problem is particularly pronounced on steep roofs (over about 35 degrees). Because installers can slip easily on these steep roofs, it is common for them to rest some weight on the installed solar racking and panels while moving around the roof, which adds additional loading to the spacer.

A third additional compressive force on the spacer may be created due to the panel-fastening process itself; some racking systems are designed such that tightening the module to the racking causes the panels to move toward each other slightly.

Due to the three aforementioned factors, it is very common for the spacer to be squeezed by the two adjacent panels when it is time to remove the spacer. Any such compressive force leads to friction between the spacer and adjacent panels, making it difficult for the installer to remove the spacer. Any such difficulty leads to inefficiency due to the unique circumstances of solar work:

First, installers are often working at height and on pitched roofs. The harder an installer must pull on the spacer to remove it, the greater the risk that they lose their balance and fall once the spacer comes out.

Secondly, the installer must often reach horizontally across the installed panel(s) in order to grasp the spacer(s) and remove them. This places the installer at the limits of his/her balance, and in a bad position to apply an outward pulling force.

Thirdly, Solar installers work year-round and are exposed to extreme weather, so they often wear thick gloves while working. This can reduce their finger dexterity and ability to grasp the spacer. The fasteners and spare parts currently used as temporary spacers provide only a small bolt head to grab onto and are particularly difficult to grasp when wearing gloves.

For at least the foregoing reasons, the present disclosure relates to a unique spacer which is easy to grasp and remove from between two panels, leading to more efficient solar panel installation.

SUMMARY OF THE INVENTION

According to an aspect of the invention, the unique spacer has a handle which protrudes from between the two panels, allowing the operator to grasp it easily even if they are wearing gloves. The spacer also features a mechanism that can be triggered by the operator to collapse the spacer to a smaller size. By collapsing, the spacer relieves some or all of the compressive force acting on it by the two adjacent panels, thus reducing the friction between the spacer and panels and allowing for easier removal.

Because it is easier to remove, this spacer reduces the risk of the operator getting off balance and falling. It also increases operational efficiency, as the operator can quickly remove the spacer regardless of any compressive forces from adjacent panels.

According to an aspect of the invention, a panel-separating spacer includes: a handle including an upper grippable portion and a lower shaft portion, the shaft having a cross-sectional shape that is elongated in at least one direction; and a clip that at least partially encompasses the shaft, the clip being expandable or collapsible in response to rotation of the shaft relative to the clip.

For example, in exemplary embodiments, the clip includes engagement portions on opposite sides for engaging adjacent panels, and the clip is in an expanded state when the elongated direction of the shaft is oriented transverse to the engagement portions of the clip to thereby spread the engagement portions apart, and the clip is in a collapsed state when the elongated direction of the shaft is oriented parallel to the engagement portions of the clip.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF DRAWINGS

FIG. 16 shows an exploded view of a spacer according to an embodiment of the present application in which a spring return mechanism is present.

FIG. 17 shows a front view of the spacer in FIG. 16.

FIG. 18 shows a top cross section view of the spacer in FIG. 16.

FIG. 19 shows a side cross section view of the spacer in FIG. 16.

DETAILED DESCRIPTION OF THE INVENTION

Figures 1, 2, 3:
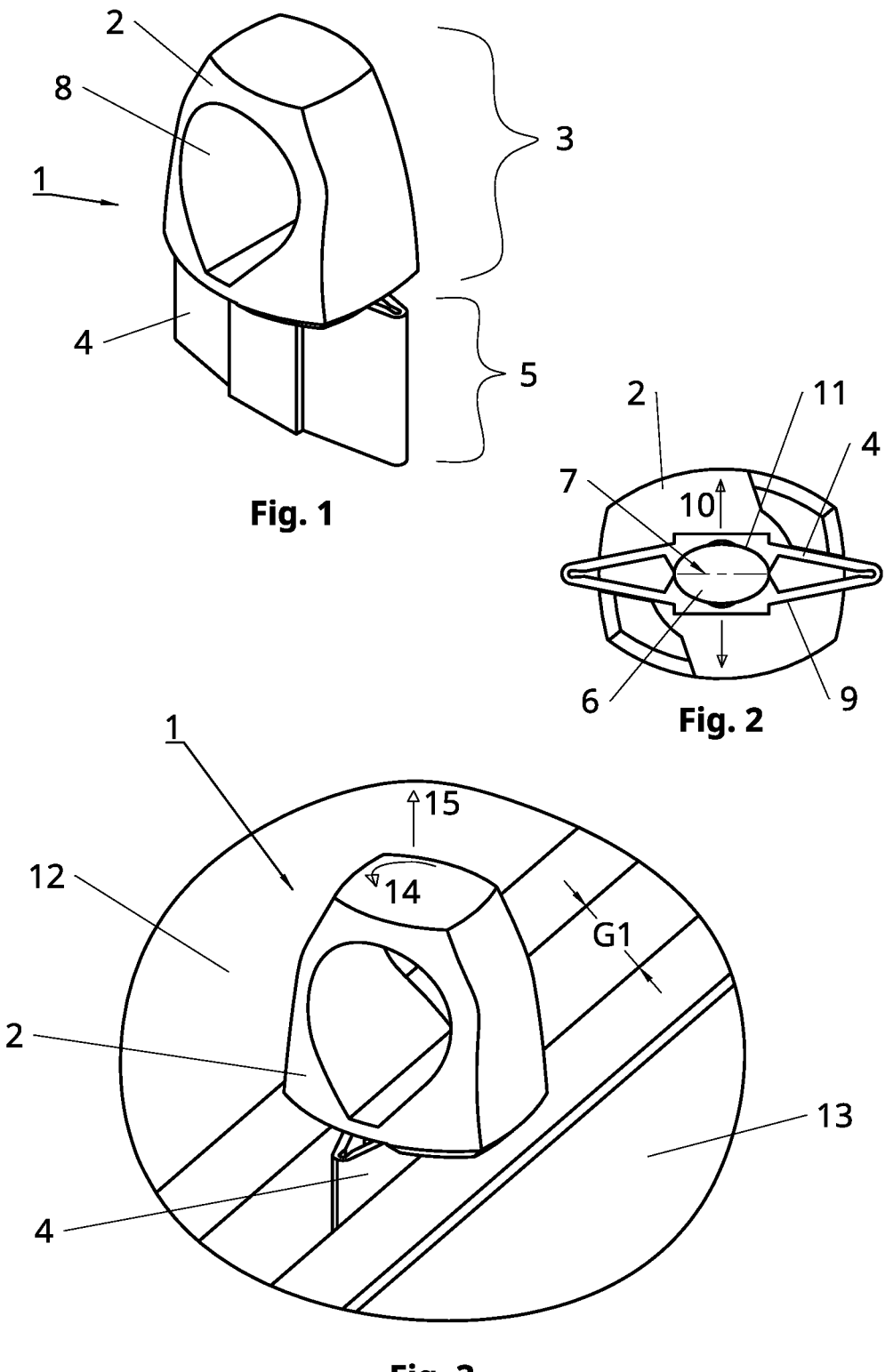
FIG. 1 shows a spacer according to an embodiment of the current application.
FIG. 2 shows a bottom view of the spacer in FIG. 1.
FIG. 3 shows the spacer in FIG. 1 positioned between two solar panels.

FIG. 1 shows an exemplary spacer 1 according to an embodiment of the present disclosure. As shown, the spacer is an assembly including at least two parts; a handle 2 which forms an upper portion 3 of the assembly, and a clip 4 which forms a lower portion 5.

FIG. 2 shows the same spacer as FIG. 1 viewed from below. Generally, the handle 2 includes an upper grippable portion 3 and a lower shaft portion 6 which has a cross-sectional shape that is elongated in at least one direction 7. The clip 4 at least partially encompasses the shaft 6 and is expandable or collapsible in response to rotation of the shaft 6 relative to the clip 4. This enables the spacer to set the spacing between adjacent panels when the clip 4 is in the expanded or engaged state, and enables the spacer to be easily removed from between the panels when in the collapsed or disengaged state.

The handle 2 includes a ring 8 which is large enough for a gloved finger to fit inside, so that it is easy to grasp and rotate. By way of example, the ring may have a size in the range of 19 to 30 millimeters.

In this embodiment, both the handle 2 and clip 4 are made of a durable plastic material with low friction properties. For example, the handle and clip may be made with polyamide, acetal or polyethylene.

As shown in FIG. 2, the clip 4 may have any suitable profile 9 that enables the clip to expand and collapse along at least one direction 10. In exemplary embodiments, the clip 4 may have a diamond shaped profile 9 which extends downward from the handle 2. The clip 4 at least partially encloses the shaft 6 which extends down from the handle 2. The shaft 6 may have any suitable oblong cross-sectional shape with a first dimension that is greater than a second dimension. For example, the shaft cross-sectional shape may be a rectangle, triangle or oval. In the illustrated embodiment, the shaft 6 has an ellipse shaped cross section 11; which has a minor axis and a major axis, the minor axis being smaller than the major axis; and an outline without sharp corners so as to permit ease of rotation against the walls of the clip 4.

FIG. 3 depicts the spacer 1 in a typical use situation, located between an upper 12 and lower 13 solar panel. In this situation the lower solar panel 13 would typically be fastened to a supporting racking structure. The upper solar panel 12 would not yet be fastened, and the spacer 1 would be establishing the gap G1 between the upper and lower panels. The spacer shown here is in its engaged, or expanded, position; in which the clip 4 establishes the desired gap between solar panels and resists compression. Once the upper panel 12 is fastened to its supporting structure, the spacer handle 2 can be rotated 14 to enter its disengaged, or collapsed, position (shown in FIGS. 6 and 7); then removed through a pulling action 15. In its disengaged position, the clip is collapsed to a size that is smaller than the desired gap G1 between solar panels.

Figures 4, 5, 6, 7:
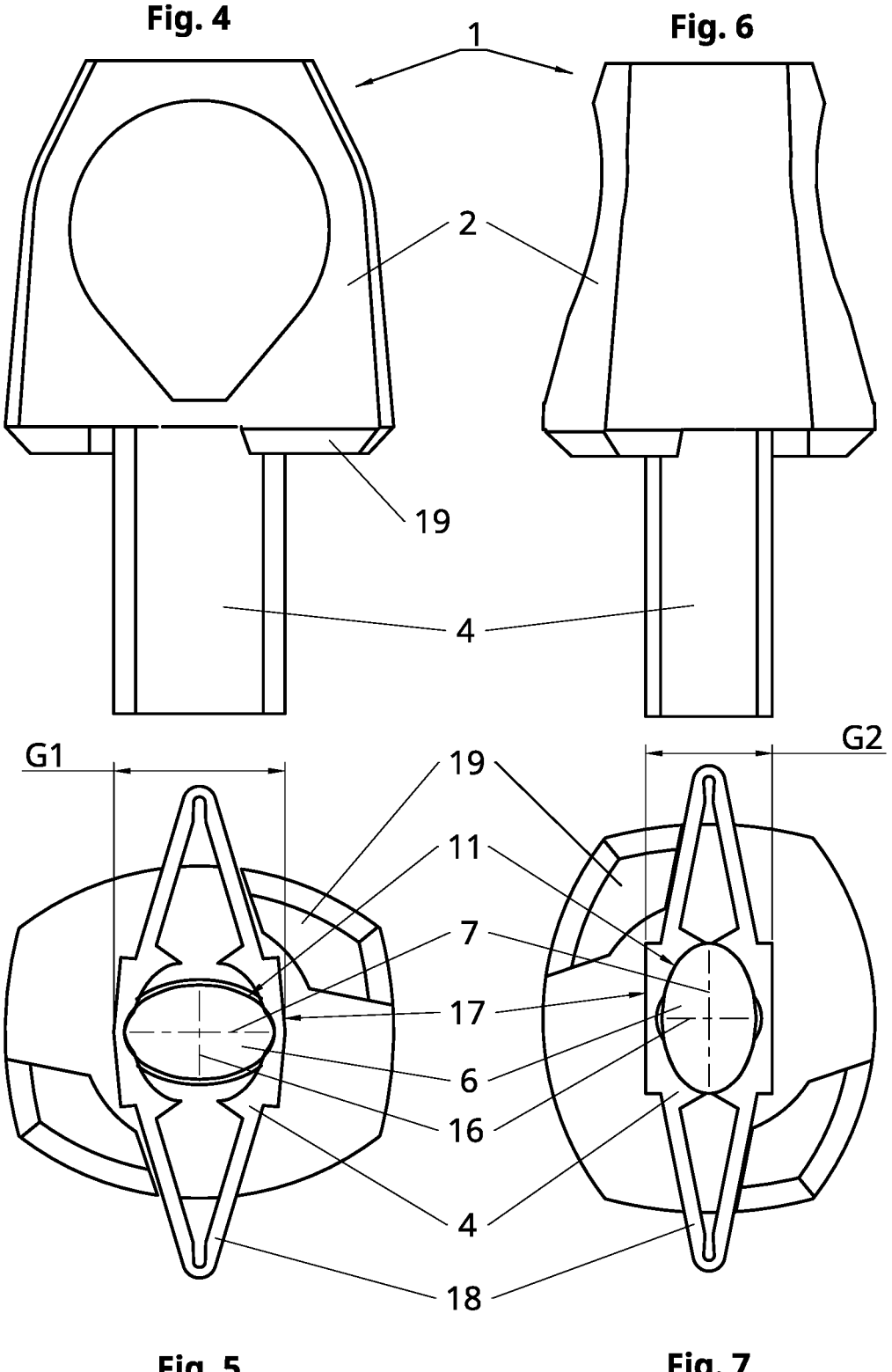
FIG. 4 shows a side view of the spacer in FIG. 1 in the engaged position.
FIG. 5 shows a bottom view of the spacer in FIG. 4.
FIG. 6 shows a side view of the spacer in FIG. 1 in the disengaged position.
FIG. 7 shows a bottom view of the spacer in FIG. 6.

In FIG. 4 the spacer assembly 1 is shown from the side in its engaged position, as if looking down the gap between two solar panels. FIG. 5 depicts the same spacer from below. The ellipse profile 11 of the handle shaft 6 has a major axis 7 and a minor axis 16; these axes being defined such that the thickness of the shaft 6 is at its maximum and minimum when measured along the respective axes. In the expanded position shown in FIGS. 4 and 5, the major axis 7 is oriented orthogonally to the edges of the two adjacent solar panels (FIG. 3: 12, 13). The clip 4 is splayed outward by the shaft 6, and the resulting width G1 of the clip matches the desired gap between solar panels (FIG. 3: 12, 13).

In FIGS. 6 and 7, the same spacer assembly 1 is shown from the same views as in FIGS. 4 and 5, but the spacer is now in its collapsed position. The handle 2 has been rotated 90 degrees so that the minor axis 16 of the shaft 6 is oriented perpendicular to the edges of the two adjacent solar panels (FIG. 3: 12, 13). The clip 4 collapses and maintains contact with the shaft 6 due to pressure from the adjacent panels (FIG. 3: 12, 13) and/or relief of elastic deformation within the clip. For example, the clip 4 may be biased toward the collapsed state whereby rotation of the shaft 6 with the elongated direction 7 oriented transverse (e.g., perpendicular) to the engagement portions (e.g. flats) 17 of the clip overcomes the bias to transition the clip to the expanded state, and rotation of the shaft 6 with the elongated direction 7 oriented parallel to the engagement portions 17 permits the bias of the clip to transition back to the collapsed state. In exemplary embodiments, the bias is provided by biasing members, such as deformable wings 18 that connect the two opposing engagement surfaces (e.g., flats) 17 and provide a spring bias toward the collapsed state. The deformable wings 18 allow the engagement portions 17 to move closer and further apart but disallow their rotation or translation in any other direction relative to each other. It is understood, of course, that the deformable wings 18 may provide connection functionality without any such spring bias, and the transition to the collapsed state may occur due to pressure from the adjacent panels (FIG. 3: 12, 13).

The spacer 1 in this embodiment includes rotation limiting features such as detents or stops 19 which prevent the clip 4 from rotating past its desired engaged and disengaged positions relative to the handle 2. These features make the spacer easier to operate and more stable in the two positions.

Figure 8:
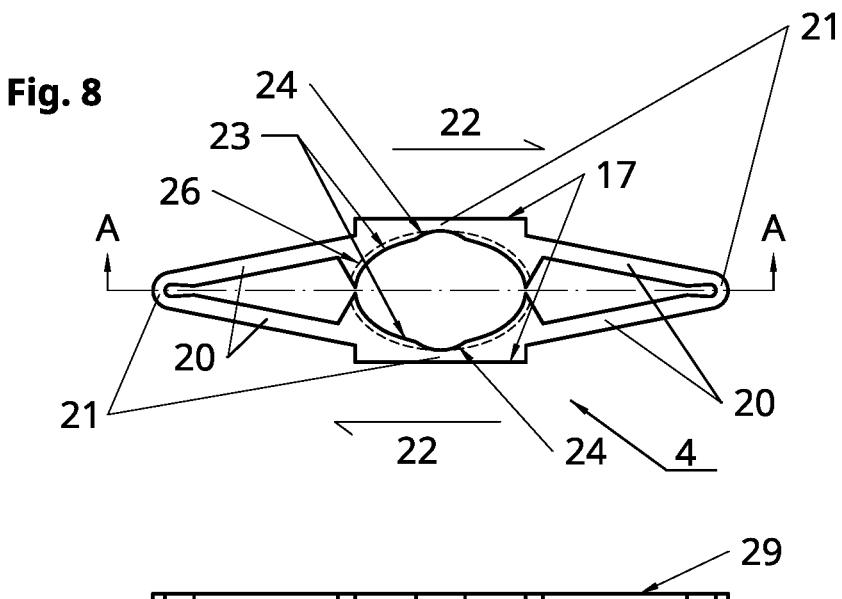
FIG. 8 shows a top view of the spacer clip in FIG. 1, where a retaining groove is used to retain the clip to the handle.

FIG. 8 shows a top view of the clip in FIG. 1. In this embodiment, the clip 4 is made of plastic and assumes the collapsed position at rest. The clip 4 features two flat, opposing outer surfaces 17 which contact the adjacent solar panels (FIG. 3: 12, 13). These surfaces are at least as wide as the desired gap size (FIG. 5: G1) between solar panels (FIG. 3: 12, 13), such that if the upper panel 12 is shifted left or right while resting on the spacer 1, the spacer will tend to slide against one or both panels instead of rotating.

This embodiment of the clip 4 includes four relatively thick walls 20 and four relatively thin portions 21 at which the clip may bend. This diamond shaped arrangement allows the two opposing panel contact surfaces 17 to move towards or away from each other as the clip 4 is collapsed and expanded; but prevents the panel contact surfaces 17 from rotating or translating side-to-side relative to one another 22, which would be undesirable as this could lead to compressive forces forming a moment about the shaft 6, potentially causing the handle 2 to rotate (FIG. 3: 14) into the collapsed position unintentionally.

The inner surfaces of the clip 4 include two shaft contact surfaces 23 which largely conform to the shape of the handle shaft 6 in the collapsed position; i.e. an ellipse in this embodiment. This allows the clip 4 to conform closely to the shape of the shaft 6 when collapsed, leading to the smallest overall thickness possible (FIG. 7: G2). The shaft contact surface 23 includes a pair of detents 24 which conform to the shaft 6 when the assembly is in the expanded position (FIG. 4, 5). These detents 24 help secure the shaft 6 in the expanded position and prevent accidental disengagement. The shape of the detents 24 matches the curvature of the shaft at the extent of its major axis (FIG. 5: 7).

Figure 9:
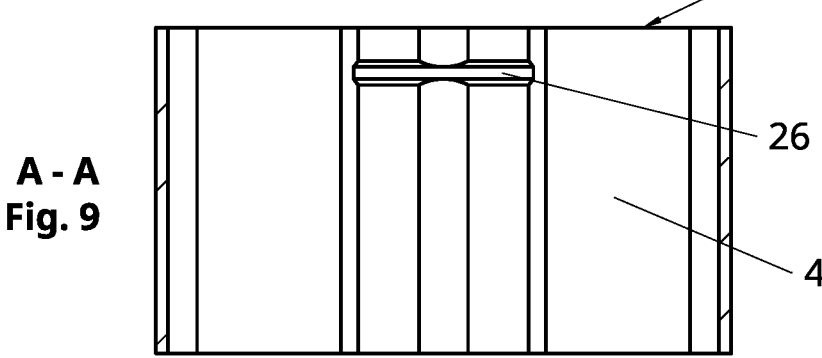
FIG. 9 shows a cross section view of the clip in FIG. 8.
Figure 10:
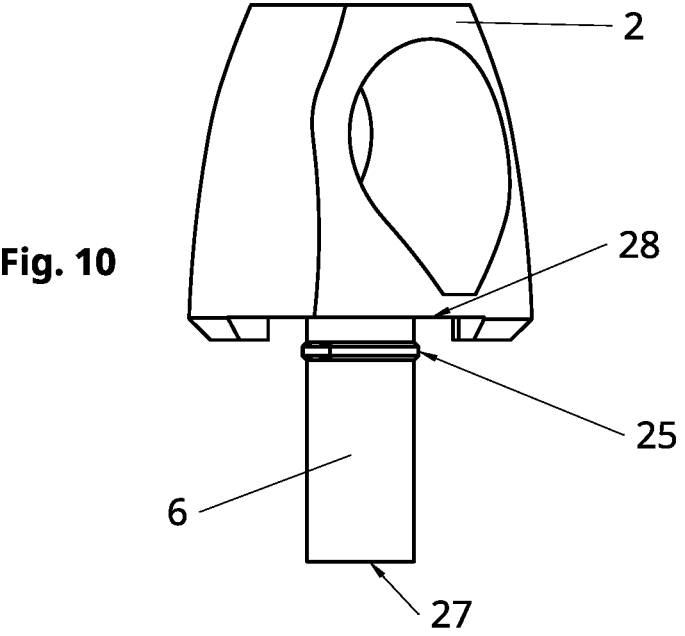
FIG. 10 shows a view of the spacer handle in FIG. 1, where a retaining rib is used to interface with the retaining groove of the clip.

The clip 4 and handle 2 include a retaining feature that prevents the clip from sliding off the end of the handle shaft 6. In the embodiment shown in FIG. 8-10, the retaining feature is a rib 25 added circumferentially to the shaft 6, and a corresponding groove 26 inscribed in the clip 4. A similar result could be achieved by using multiple ribs along the length of the shaft 6 and clip 4, one or more retaining rings located along the length of the shaft, a fastener inserted into the lower end of the shaft 27, or one or more captive or interlocking features between the lower surface of the handle 28 and the upper surface of the clip 29.

Figures 11, 12, 13, 14, 15:
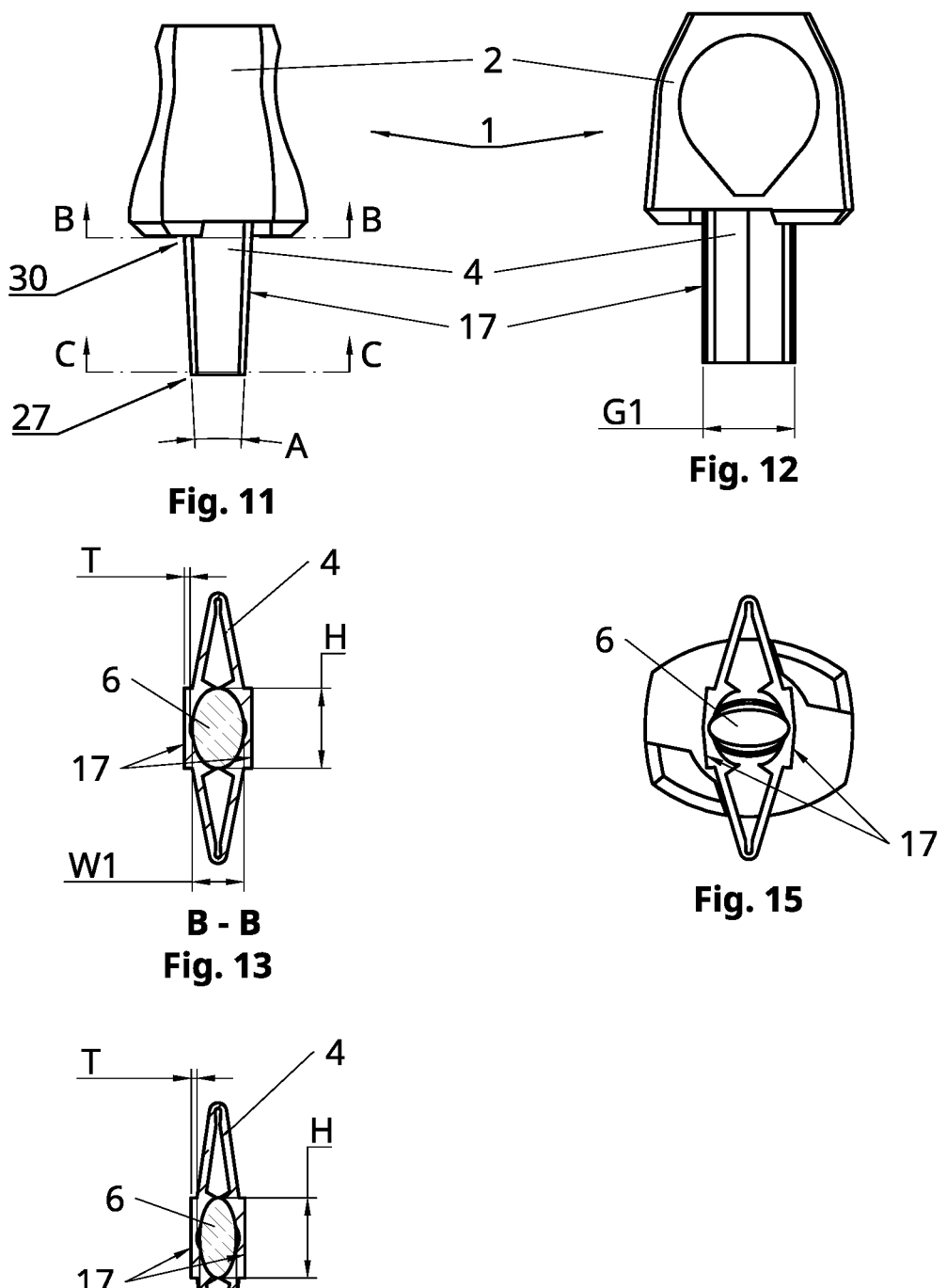
FIG. 11 shows a side view of a spacer in the disengaged position according to an embodiment of the present application in which the sides of the handle shaft are tapered.
FIG. 12 shows a side view of the spacer in FIG. 11 in the engaged position.
FIG. 13 shows a cross section of the spacer in FIG. 11 taken near the base of the handle shaft.
FIG. 14 shows a cross section of the spacer in FIG. 11 taken near the lower terminus of the handle shaft.
FIG. 15 shows a bottom view of the spacer in FIG. 12.

FIG. 11-15 show another embodiment of the spacer in which shaft 6 and clip 4 taper from a larger size near the base of the shaft 30 to a smaller size near the extent of the shaft 27. FIGS. 11, 13 and 14 depict this embodiment of the spacer assembly 1 in the collapsed position, while FIGS. 12 and 15 depict the spacer assembly in the expanded position. FIG. 13 depicts a cross section B-B of the clip and shaft near the base of the shaft 30, while FIG. 14 depicts a cross section C-C taken near the extent of the shaft 27. FIG. 15 depicts a bottom view of the spacer in FIG. 12.

The taper feature aids the operator in removing the spacer from between two panels (FIG. 3: 12, 13) in situations where there is still some compressive force acting on the spacer by the adjacent panels, even after collapsing the spacer. In these situations, as the operator starts to pull the spacer 1 out from between the panels (FIG. 3: 15), the spacer becomes easier to pull as the panels are allowed to move closer together, transferring more weight to their supporting structure(s).

The desired taper is such that the engagement portions 17 of the clip 4 form an acute angle A in the collapsed position shown in FIG. 11; but in the expanded position shown in FIG. 12, the engagement portions 17 are parallel to each other and spaced at the desired gap size G1. Any taper in the expanded position would be undesirable, as this could lead to variance in the exact gap size (FIG. 3: G1) established by the spacer depending on the vertical positioning of the spacer relative to the adjacent panels. Such vertical positioning cannot be easily controlled in practice.

One way to accomplish the desired taper is to maintain a constant clip wall thickness T at the engagement portions (flats) 17 of the clip 4, and a constant shaft size H measured along the major axis 7 of the shaft profile; but to gradually reduce the shaft width (measured along the minor axis 16 of the shaft profile) from a larger width W1 near the base of the shaft 30 to a smaller width W2 at the lower extent of the shaft 27.

In the embodiments discussed so far, the operator must remember to manually reset the spacer into the expanded position prior to using it to set the gap between adjacent panels. If the operator forgets this step, the gap between panels would be set according to the collapsed thickness of the spacer, which could lead to inconsistent gap sizing. To eliminate the need for the operator to reset the spacer, FIGS. 16-19 show an embodiment of the current application in which a torsion or constant-force spring 31 is used to automatically return the spacer 1 to its expanded position. The spring 31 acts between the handle 2 and clip 4 and is preloaded such that it exerts a torque 32 in the same direction whether they are in the collapsed or expanded position. The direction of the torque 32 is such that it tends to rotate the clip 4 into its expanded position, and the magnitude of the torque 32 is large enough to expand the flexible clip 4 and overcome any friction in the mechanism. For example, in this embodiment a torque of 1 in-lb is sufficient.

The spring 31 in this example is a constant-force spring; the center portion 33 of which passes through a hole 34 in the base of the shaft 6, the body 35 of which is coiled within a recess 36 in the base of the handle 2, and the ends 37 of which are hooked onto protrusions 38 extending upward from the clip 4. A similar effect could be achieved using a torsion spring instead of a constant force spring.

Figures 20, 21, 22, 23:
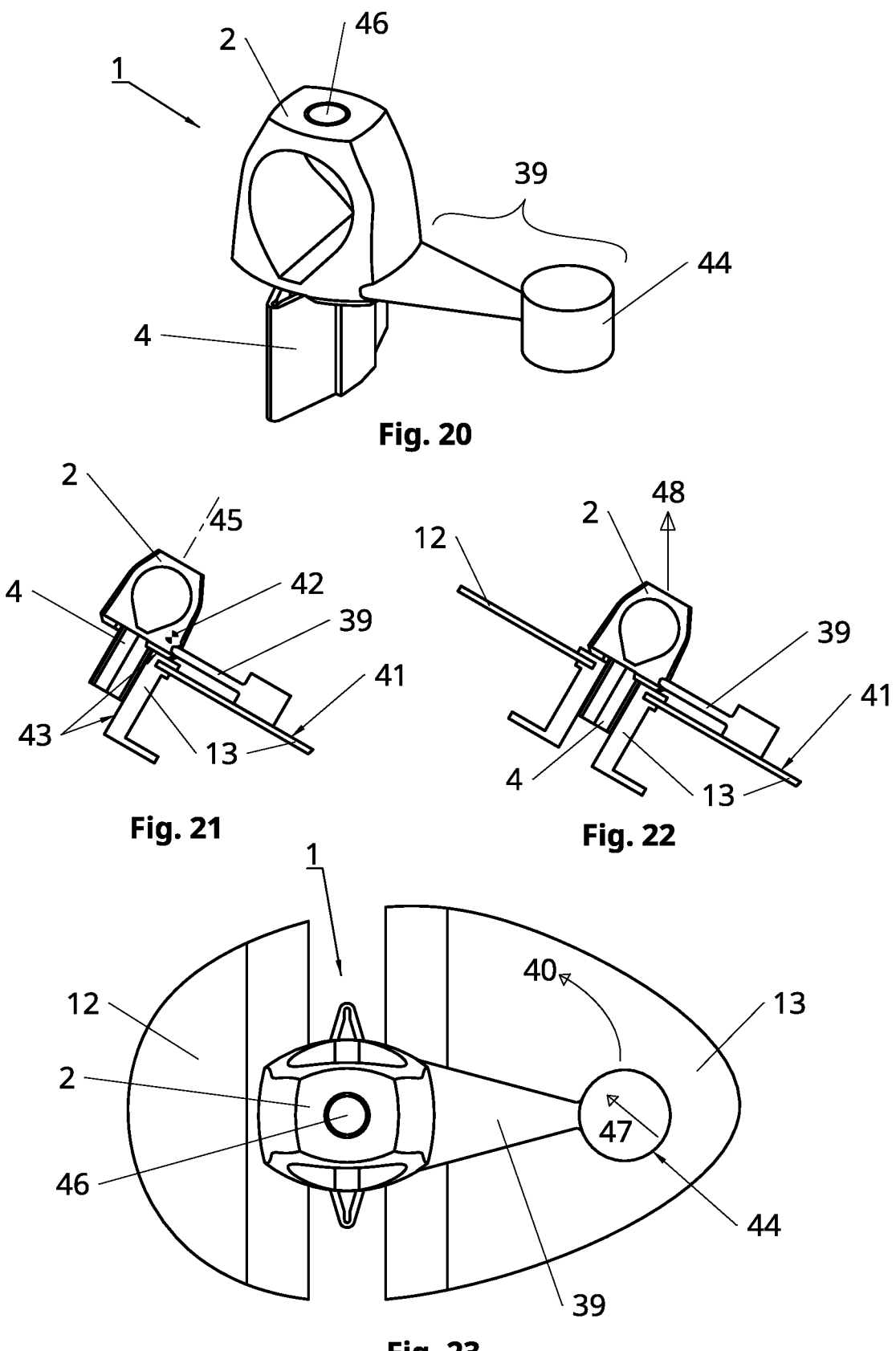
FIG. 20 shows a spacer according to an embodiment of the present application in which a supporting leg and remote retrieval features are present.
FIG. 21 shows a side view of the spacer in FIG. 20 in the engaged position and perched on the upper edge of a solar panel.
FIG. 22 shows a side view of the spacer in FIG. 20 in the engaged position and positioned between two solar panels.
FIG. 23 shows a top view of the spacer in FIG. 20 in the engaged position.

To allow the spacer to be perched on the upper edge of a lower solar panel without an upper solar panel to compress it and hold it in place, another embodiment of the spacer includes a supporting leg as shown in FIGS. 20-23. In this embodiment, the supporting leg 39 is an extension of the handle 2 and rotates 40 along with the handle during operation. In the expanded position, the supporting leg 39 extends over the surface of the lower solar panel 41, such that the center of mass of the spacer assembly 42 is biased towards the lower solar panel 13. As shown in FIG. 21, the spacer 1 rests on the solar panel 13 with a wide stance between the clip and handle base contact surfaces 43 and the supporting leg 39; thus reducing the risk of the spacer falling off due to wind, vibration or other disturbances. This ability to perch the spacer can improve solar installer efficiency, as several spacers can be positioned on a lower row of solar panels at a time prior to installing all of the corresponding upper panels.

The embodiment shown in FIGS. 20-23 also includes a remote retrieval feature designed to ease removal and retrieval of the spacer in situations where the spacer cannot be easily reached by the operator. These features compliment the supporting leg feature, but the remote retrieval and supporting leg features can be included in the spacer independent of each other. The remote retrieval feature consists of a vertical gripping surface 44 spaced radially from the spacer's axis of rotation 45, and a magnet 46 embedded in the handle 2.

The vertical gripping surface 44 can be gripped and pulled by the end of a standard tape measure 47, which the operator may extend from their location to the spacer 1. By pulling on the gripping surface 44, a moment is created about the spacer's axis of rotation 45 which rotates 40 the spacer into the collapsed position. Once collapsed, the spacer 1 can be removed by positioning the tape measure end over the magnet 46 and lifting upwards 48. Finally, the operator can retrieve the spacer by retracting the tape measure.

The gripping surface 44 should be spaced sufficiently far from the main spacer's axis of rotation 45 to produce an adequate moment when pulled by the tape measure 47. For example, in the embodiment shown, this distance is 40 mm. The magnet 46 should be of a sufficient size and strength to allow the tape measure to lift the full weight of the spacer assembly. In the embodiment shown, the magnet 46 is rated for a lifting force of 2.8 lbs. The magnet 46 is located approximately above the center of mass 42 of the spacer assembly 1 so that the spacer does not exert a twisting moment on the tape measure when it is suspended by the tape measure.

It is to be understood that terms such as "top," "bottom," "upper," "lower," "left," "right," "front," "rear," "forward," "rearward," and the like as used herein may refer to an arbitrary frame of reference, rather than to the ordinary gravitational frame of reference.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A panel-separating spacer comprising:
   a handle including an upper grippable portion and a lower shaft portion extending along a longitudinal axis of rotation, the lower shaft portion having a cross-sectional shape that is elongated in at least one direction; and
   a clip that at least partially encompasses the lower shaft portion, the clip being selectively movable in a direction transverse to the longitudinal axis of rotation between an expanded state and a collapsed state in response to rotation of the lower shaft portion relative to the clip,
   wherein the lower shaft portion has at least one of an oval or rectangular profile such that the lower shaft portion is thicker when measured in a first direction than when measured in a second direction orthogonal to the first direction; and the clip includes two opposing flat surfaces configured to at least one of rest or slide across opposing surfaces of two adjacent panels, and also including an inner shaft mating surface that matches the shape of the lower shaft portion, and the clip further including at least one deformable wing connecting the two opposing flat surfaces and allowing the two opposing flat surfaces to move closer and farther apart and preventing rotation or translation of the two opposing flat surfaces in any other direction relative to each other.

2. The spacer according to claim 1, wherein the clip has engagement portions on opposite sides, and the clip is in the expanded state when the elongated direction of the lower shaft portion is oriented transverse to the engagement portions of the clip to thereby spread the engagement portions apart, and the clip is in the collapsed state when the elongated direction of the lower shaft portion is oriented parallel to the engagement portions of the clip.

3. The spacer according to claim 1, wherein the clip is biased toward the collapsed state, and rotation of the lower shaft portion about the longitudinal axis of rotation relative to the clip overcomes the bias to transition the clip into the expanded state.

4. The spacer according to claim 1, wherein the lower shaft portion and the clip include a retaining feature which enables rotation of the lower shaft portion and the clip relative to each other and prevents axial translation of the clip relative to the lower shaft portion.

5. The spacer according to claim 1, wherein the handle includes protrusions which constrain rotation of the clip to 90 degrees of rotation relative to the handle.

6. The spacer according to claim 1, wherein a clip surface which contacts the lower shaft portion includes a detent corresponding to a desired stable position of the spacer.

7. The spacer according to claim 1, wherein the lower shaft portion tapers from a first width at a base of the handle to a smaller width at a lower extent of the lower shaft portion as measured along a minor axis; and where such width measured along a major axis remains constant.

8. The spacer according to claim 1, wherein a spring is used to produce a torque between the handle and clip which forces the clip into the expanded state at rest.

9. The spacer according to claim 1, wherein a supporting leg extends outward from the handle such that the supporting leg prevents the spacer from tipping over when perched on an upper edge of a horizontal or tilted panel.

10. The spacer according to claim 1, wherein the handle has a laterally protruding arm with a vertical surface at an end of the protruding arm, the vertical surface being capable of supporting a pulling load by an end of a standard tape measure; and wherein the handle includes a magnet, the magnet being of sufficient size and strength to support a weight of the spacer when suspended by the end of a tape measure.

11. A panel-separating spacer comprising:

a handle including an upper grippable portion and a lower shaft portion extending along a longitudinal axis of rotation, the lower shaft portion having a cross-sectional shape that is elongated in at least one direction; and a clip that at least partially encompasses the lower shaft portion, the clip being selectively movable in a direction transverse to the longitudinal axis of rotation between an expanded state and a collapsed state in response to rotation of the lower shaft portion relative to the clip, wherein a spring is used to produce a torque between the handle and clip which forces the clip into the expanded state at rest.

12. A panel-separating spacer comprising:

a handle including an upper grippable portion and a lower shaft portion extending along a longitudinal axis of rotation, the lower shaft portion having a cross-sectional shape that is elongated in at least one direction; and a clip that at least partially encompasses the lower shaft portion, the clip being selectively movable in a direction transverse to the longitudinal axis of rotation between an expanded state and a collapsed state in response to rotation of the lower shaft portion relative to the clip, wherein a supporting leg extends outward from the handle such that the supporting leg prevents the spacer from tipping over when perched on an upper edge of a horizontal or tilted panel.

* * * * *